United States Patent [19]

Ohtsuka

[11] Patent Number: 5,189,556
[45] Date of Patent: Feb. 23, 1993

[54] COLOR PHOTOGRAPHY OPTICAL SYSTEM

[75] Inventor: Hiroyuki Ohtsuka, Tokyo, Japan

[73] Assignee: Kabushiki Kaisha Topcon, Tokyo, Japan

[21] Appl. No.: 821,371

[22] Filed: Jan. 16, 1992

[30] Foreign Application Priority Data

Jan. 17, 1991 [JP] Japan .................................. 3-003627

[51] Int. Cl.$^5$ ..................... G02B 27/14; G03B 29/00; A61B 3/14; H04N 7/18
[52] U.S. Cl. .................................. 359/634; 359/434; 359/663; 351/206
[58] Field of Search .............. 359/634, 638, 640, 434, 359/834, 833, 663; 351/206, 207, 208, 205

[56] References Cited

U.S. PATENT DOCUMENTS

| | | | |
|---|---|---|---|
| 4,437,733 | 3/1984 | Takahashi et al. | 359/683 |
| 4,679,919 | 7/1987 | Itoh et al. | 351/206 |
| 4,717,952 | 1/1988 | Kohayakawa et al. | 351/206 |

Primary Examiner—Jon W. Henry
Attorney, Agent, or Firm—Finnegan, Henderson, Farabow, Garrett and Dunner

[57] ABSTRACT

To easily correct color shading merely by adjusting the arrangement of an optical system. A light beam incident on a three prism type color separation optical system 1 having photographic devices 7, 8, 9 and guided to the photographic devices, is effectively telecentric on the side of the photographic devices.

11 Claims, 9 Drawing Sheets

COLOR PHOTOGRAPHY OPTICAL SYSTEM

BACKGROUND OF THE INVENTION

1. Field of the Invention

This invention relates to a color photographic optical system wherein the occurrence of color shading can be avoided.

2. Prior Art

In the prior art, a color photographic optical system is known which uses a three prism type separation optical system as shown in FIG. 11. In FIG. 11, 1 is a color separation optical system which has three prisms 2, 3 and 4 joined to each other. There is a very thin aero layer between the prisms 3 and 4. An interference film 5 is provided prisms 2 and 3, and an interference film 6 is provided between prisms 3 and 4. These interference films 5 and 6 act as a dichroic filter. When a light beam incident on the color separation optical system 1, it is separated into three beams, red (R), green (G) and blue (B) due to the transmitting and reflecting characteristics of the interference films 5 and 6. The light beams are guided respectively to the imaging surfaces of CCD 7, 8 and 9 which act as photographic devices, and images are formed on the surfaces. CCD 7, 8 and 9 output R, G and B signals depending on the amount of light received.

In general, however, if the angle of the light beam incident on the color separation optical system varies, the reflectance and transmittance of the interference films 5 and 6 also vary. Further, the larger the angle of the light beam incident on the color separation optical system with respect to the interference films, the more the transmittance characteristics of the interference films are shifted towards the short wave end of the color spectrum.

First, we will assume that the image output of the light beam formed in the center of CCD 7, 8 and 9 is properly balanced. A light beam incident at an oblique angle (e.g. $\theta$) with respect to the photographic optic axis 10 forms an image at the peripheries of CCD 7, 8 and 9.

The transmittance and reflectance of the interference films for light which forms an image in this peripheral area is different from the transmittance and reflectance of the interference films for light which forms an image in the central area of CCD 7, 8 and 9, and therefore the output balance from CCD 7, 8 and 9 for light forming an image in the peripheral area is upset. This causes the occurrence of color shading where color unevenness appears at the edges of a television screen.

This is due to the fact that, considering only the chief ray of the beam for example, the angle of inclination of the interference films 5 and 6 is different for the central area and peripheral area of CCD 7, 8 and 9.

In color TV cameras having a three prism type color separation optical system 1, a possible way of correcting for color shading is to incorporate a correction circuit in the signal processing unit. Color shading can also be corrected by the following method.

First, the position of the exit pupil is fixed by setting conditions such as the magnification of the optical system and aperture diaphragm, and the incidence angle of the chief ray of the beam incident on the color separation optical system 1 with respect to the photographic optic axis 10 is computed. The computed values are then corrected for color shading by applying a correction to each picture element of the CCD 7, 8, 9 for R, G, B.

However, in the former type of color TV camera, the signal processing unit is bulky and the color balance has to be reset every time the photographic conditions are modified. In the latter type of color TV camera, on the other hand, an operational circuit is required which makes the camera costly.

SUMMARY OF THE INVENTION

It is therefore an object of the invention to provide a color photography optical system wherein a color shading correction can easily be obtained merely by suitably arranging the optical system.

To achieve the above object, the color photography optical system of this invention is characterized in that the light beam incident on the three prism type color separation optical system having an imaging device and which is guided to this device, is effectively telecentric on the side of the device.

According to the color photography optical system of this invention, the light beam incident on the three prism type color separation optical system having a photographic device and which is guided to this device, is effectively telecentric on the side of the device.

The conditions under which the chief ray of the beam largely contributing to formation of the peripheral part of image on the screen is incident on the interference film of the color separation optical system, and the conditions under which the chief ray of the beam largely contributing to formation of the central part of the image on the screen is incident on the interference film of the color separation optical system, are substantially identical. Color shading is thereby avoided.

BRIEF DESCRIPTION OF THE DRAWINGS

FIG. 12 is a schematic drawing of a conventional color photography optical system the optical path in a 45 degree field of the chief ray of the beam in.

FIG. 13 is a schematic drawing of conventional color photography optical system showing the optical path in a 20 degree field of the chief ray of the beam in.

DESCRIPTION OF THE PREFERRED EMBODIMENTS

Figure 1:
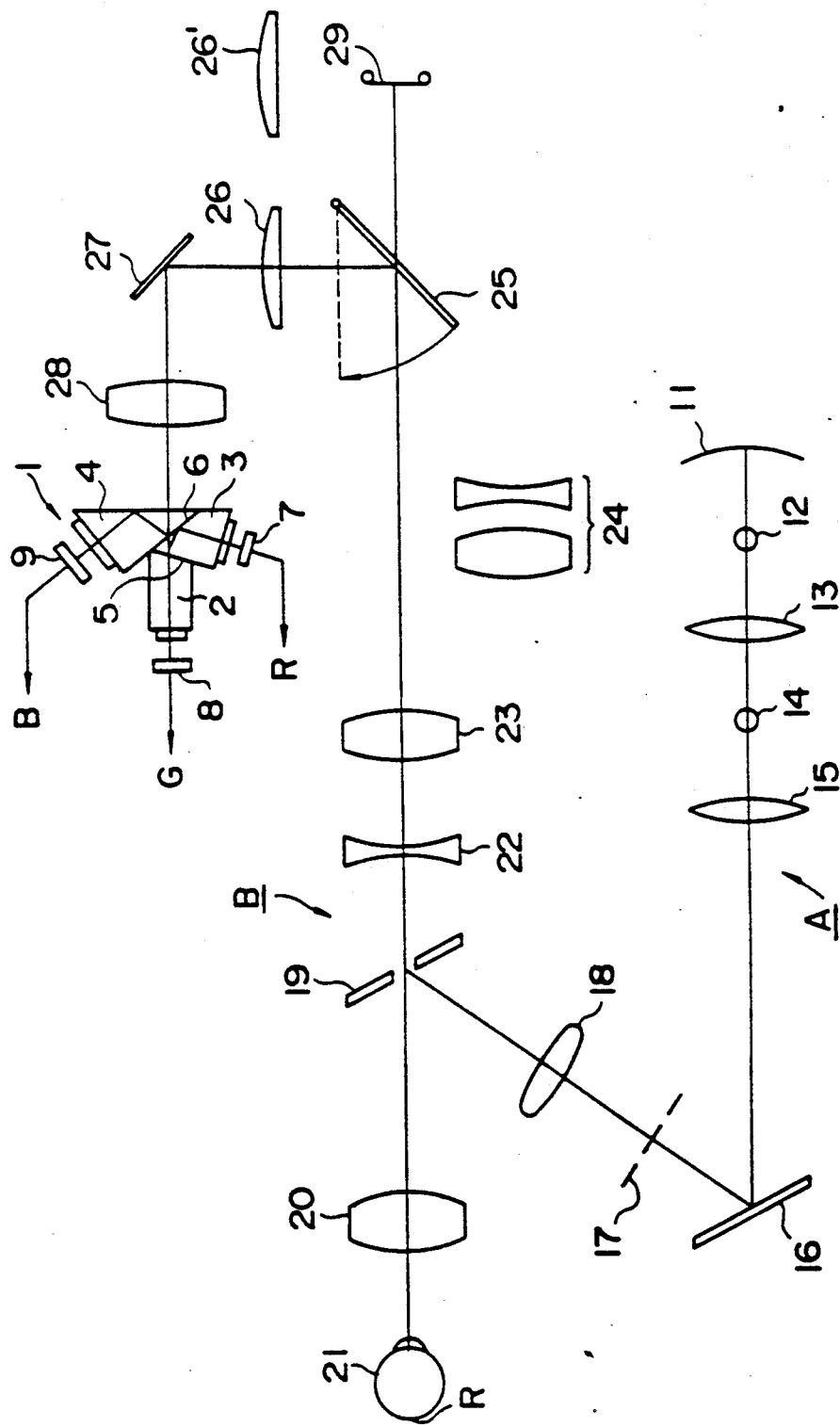
FIG. 1 is a schematic drawing of a color photography optical system according to this invention.
Figure 2:
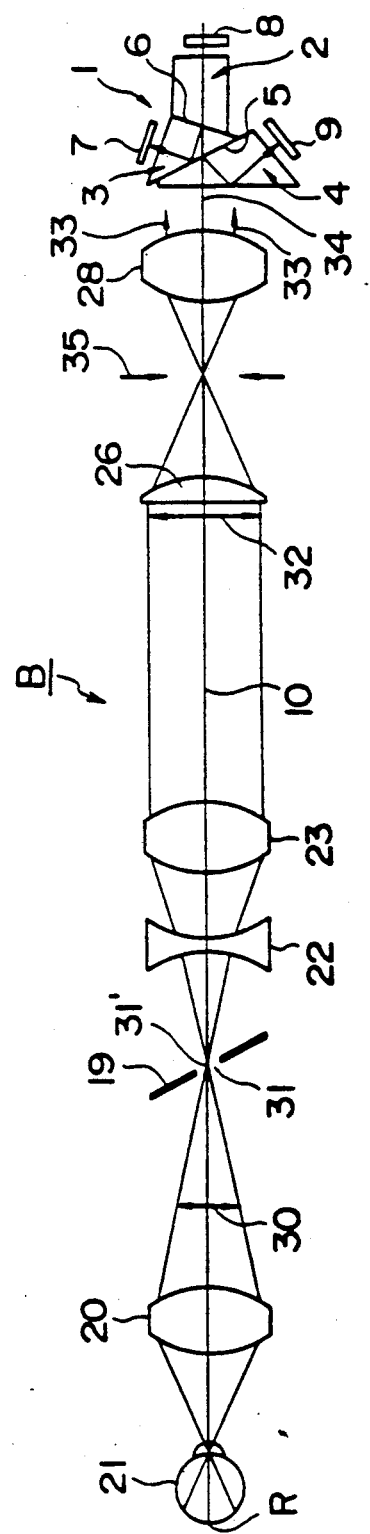
FIG. 2 is a schematic drawing showing the optical path of the chief ray of the beam in a 45 degree field of the color photography optical system shown in FIG. 1.
Figure 3:
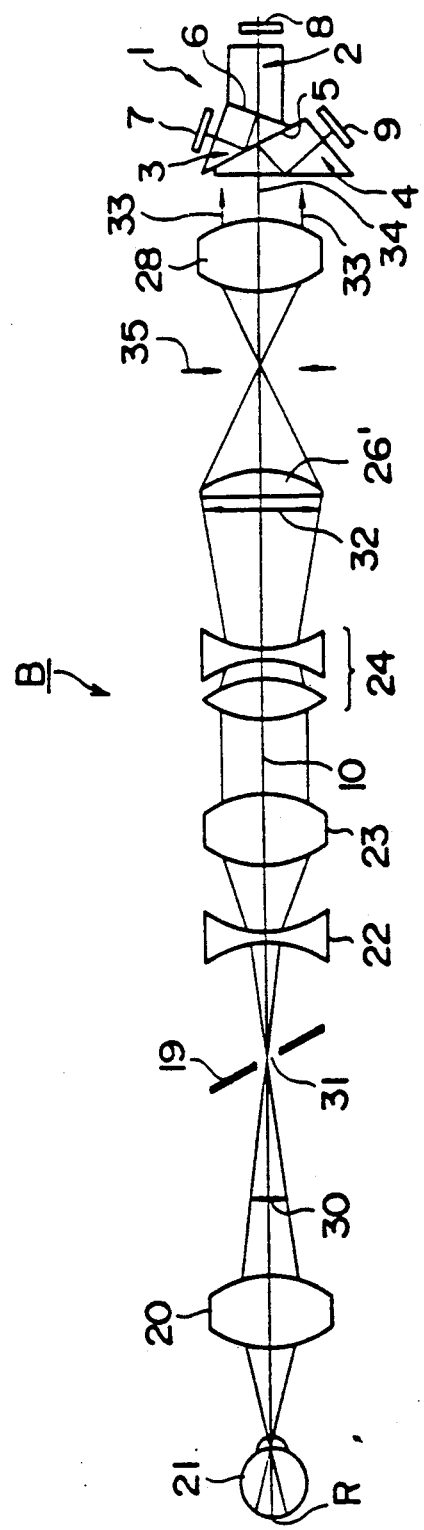
FIG. 3 is a schematic drawing showing the optical path of the chief ray of the beam in a 20 degree field of the color photography optical system shown in FIG. 1.

FIGS. 1-3 show a first embodiment of the color photographic optical system of this invention.

In FIG. 1, A is an illuminating optical system and B is a photographic optical system. The illuminating optical system A broadly comprises a concave mirror 11, halogen lamp 12 to provide illumination for observation, relay lens 13, xenon lamp 14 to provide illumination for photography, condenser lens 15, reflecting mirror 16, ring slit 17 and relay lens 18. Illuminating light is guided to the fundus R of a subject's eye 21 via a holed mirror 19, and an objective lens 20 which acts as a photographic lens.

The photographic optical system B comprises a focusing lens 22, imaging lens 23, variable lens 24, quick return mirror 25, field lens 26, reflecting mirror 27, relay lens 28 for TV, and color separation optical system 1. The holed mirror 19 and objective lens 20 are common to the illuminating optical system A and the photographic optical system B. When a fundus image is to be formed on a film 29, the quick return mirror 25 is removed from the optical path of the photographic optical system B. The variable lens 24 is inserted in the optical path of the photographic optical system B when a camera angle of 20 degrees is selected, and the field lens 26 is inserted in the optical path of the photographic optical system B when a camera angle of 45 degrees is selected. The field lens 26' is inserted in the optical path when a camera angle of 20 degrees is selected.

FIGS. 2 and 3 show a schematic representation of the photographic optical system B of this fundus camera. In FIGS. 2 and 3, identical components to those shown in FIG. 1 are indicated by the same symbols. FIG. 2 shows the chief ray of the beam when taking a photograph of the fundus R at a camera angle of 45 degrees (an angle of coverage 45 degrees). First, an aerial image 30 of the fundus R is formed by the objective lens 20. The chief ray of the beam that forms this aerial image 30 passes through a center 31' of a hole 31 of the hold mirror 19 which functions as an aperture diaphragm. The chief ray of the beam that has passed through the center 31' is guided to the focusing lens 22 and imaging lens 23 so as to form another aerial image 32 in front of the relay lens 26. The chief ray of the beam which is guided to the periphery of CCD 7, 8 and 9, and which forms this aerial image, is made parallel with respect to the photographic optic axis 10 by the TV relay lens 28.

Figure 4:
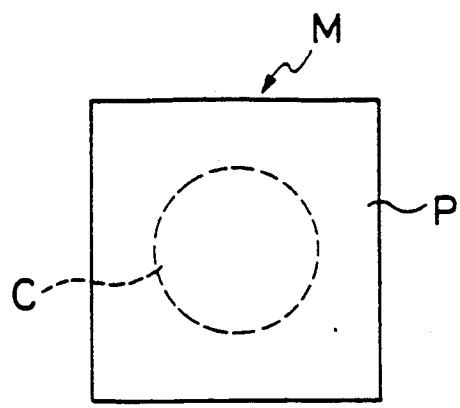
FIG. 4 is a plan view for the purpose of describing the light beam forming an image of the central part, and the light beam forming an image on the peripheral part, of a screen.

The light beam is thus telecentric on the side of the imaging device 7, 8, 9 (on the side of the color separation optical system 1). The chief ray of the beam passes through the interference films 5, 6 parallel to the photographic optic axis 10 and is guided to CCD 7, 8, 9. The incidence angle of the chief ray of the beam 33 forming an image on the peripheral part P of the screen M shown in FIG. 4 with respect to the interference films 5, 6 of the color separation optical system 1, is thus substantially the same as the incidence angle of the chief ray of the beam 34 forming an image on the central part C of the screen M with respect to the interference films 5, 6. In other words, the conditions under which the chief ray of the beam largely contributing to formation of an image on the peripheral part P of the screen M and the conditions under which the chief ray of the beam largely contributing to formation of an image on the central part C of the screen M are substantially identical. Color shading is thereby avoided.

When taking a photograph of the fundus at a camera angle of 20 degrees (an angle of coverage 20 degrees), the variable lens 24 is inserted in the path of the photographic optical system 3 as shown in FIG. 3. The field lens 26 is then removed from the optical path of the photographic optical system B, and a field lens 26' having a different focal length from the focal length of the field lens 26 is inserted in the optical path of the photographic optical system 3. This procedure makes the light beam incident on the color separation optical system 1 telecentric.

Figure 5:
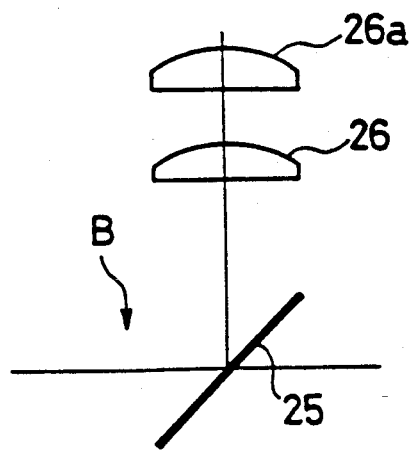
FIG. 5 is a schematic drawing showing one modification of the photographic optical system of Embodiment 1.

In this embodiment, the field lens 26 was replaced by the field lens 26' when the camera angle (the angle of coverage) of the photographic optical system B was changed, but the field lens 26 may also be used as a chief lens with a reference power, and an auxiliary lens 26a inserted in the optical path of the photographic optical system B when the camera angle is changed from 45 degrees to 20 degrees as shown in FIG. 5. In FIGS. 2 and 3, 35 is the entrance pupil of the TV relay lens 28. The position of the TV relay lens 28 on the optic axis of the entrance pupil 35 when a photograph is taken at a camera angle of 45 degrees the angle of coverage 45 degrees, is the same as its position when a photograph is taken at a camera angle of 20 degrees (the angle of coverage 20 degrees).

The color photography optical system of this invention will now be compared to a conventional color photography optical system.

Figure 11:
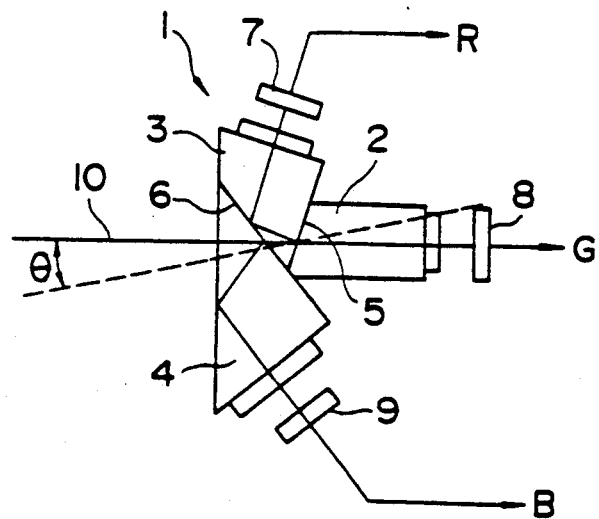
FIG. 11 is a schematic drawing of a color separation optical system for the purpose of describing the phenomenon of color shading.
Figure 12:
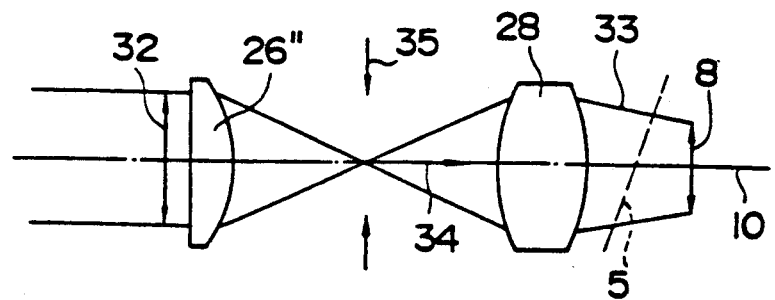
Figure 13:
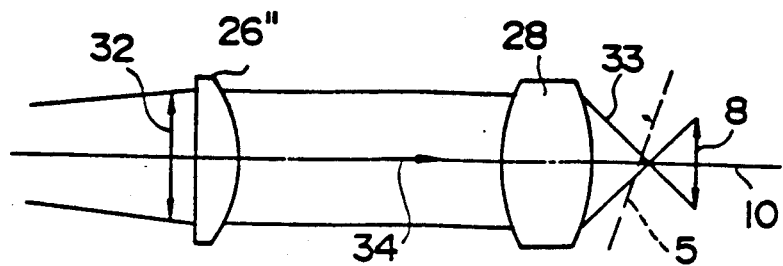

In conventional three prism type color photographic optical system, as shown by the schematic representation of FIGS. 11 and 12, the inclination angle of the chief ray of the beam 33 which largely contributes to formation of an image on the peripheral part P of the screen M respect to, for example, the interference film 5, is different from the inclination angle of the chief ray of the beam 34 which largely contributes to formation of an image on the central part C of the screen M with respect to the interference film 5. The transmittance and reflectance characteristics of the interference film 5 with respect to the light beam forming an image in the center of, for example, CCD 8, are therefore different from the transmittance and reflectance characteristics of the interference film 5 with respect to the light beam forming an image at the periphery of CCD 8. In the color photographic optical system of the present invention, on the other hand, the chief ray of the beam 33 which contributes to the formation of an image on the peripheral part P of the screen M is parallel to the chief ray of the beam 34 which contributes to the formation of an image on the central part C of the screen M. The transmittance and reflectance characteristics with respect to the light beam forming an image on the peripheral part P of the screen M are therefore substantially the same as the transmittance and reflectance characteristics with respect to the light beam forming an image on the central part C of the screen M. In FIGS. 11 and 12, a schematic representation of only the interference film 5 is shown.

Figure 6:
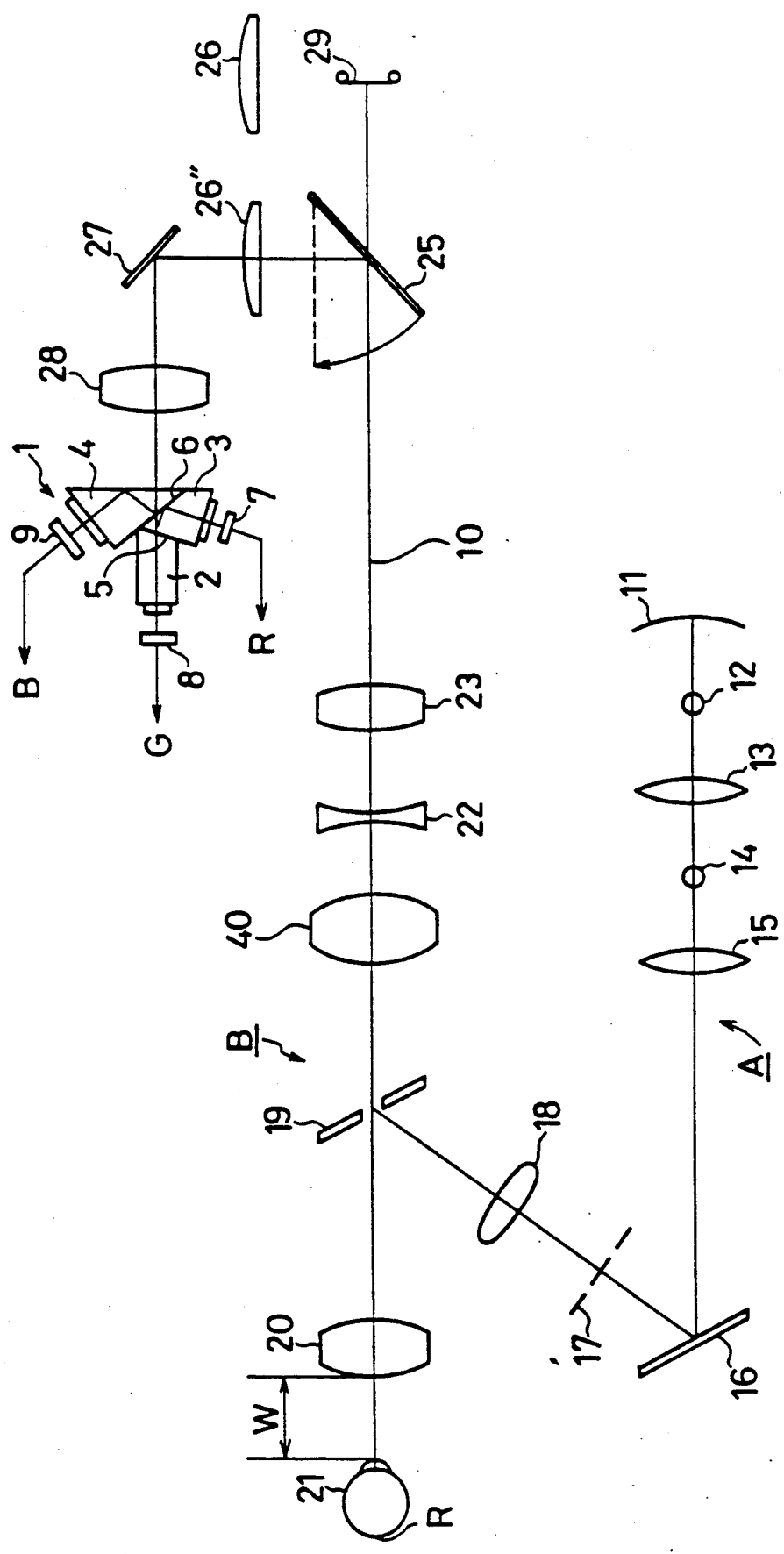
FIG. 6 is a schematic drawing showing a second embodiment of the color photography optical system of this invention.

FIG. 6 shows embodiment of the color photography optical system of the invention. In this embodiment, a lens 40 for imaging the front portion of the eye is provided between the holed mirror 19 and the focus lens 22 such that it can be inserted or removed.

By lengthening the working distance W between the subject's eye 21 and the object lens 20 prior to taking a photograph and inserting the lens 40 between the holed mirror 19 and the focusing lens 22, the front parts of the eye 21 such as the iris and cornea may be observed. In this way it is easy to align the photographic optic axis 10 with the center of the pupil of the subject's eye 21. The field lens 26 can be removed from the optical path of the photographic optical system B in synchronism with the insertion of this lens 40 for observing the front portion of the eye in the optical path of the photographic optical system B, and a field lens 26″ corresponding to the lens 40 inserted in the path so as to make the light beam incident on the color separation optical system 1 telecentric. Instead of the lens 40, several diopter correcting lenses, not shown, may be provided outside the range of movement of the focusing lens 22 so as to correct the diopter of the subject's eye 21. In this case also, field lenses may be provided corresponding to these several correction lenses, these field lenses being inserted in the optical path in synchronism with the diopter correcting lenses so that the light beam incident on the color separation optical system 1 is telecentric.

Figure 7:
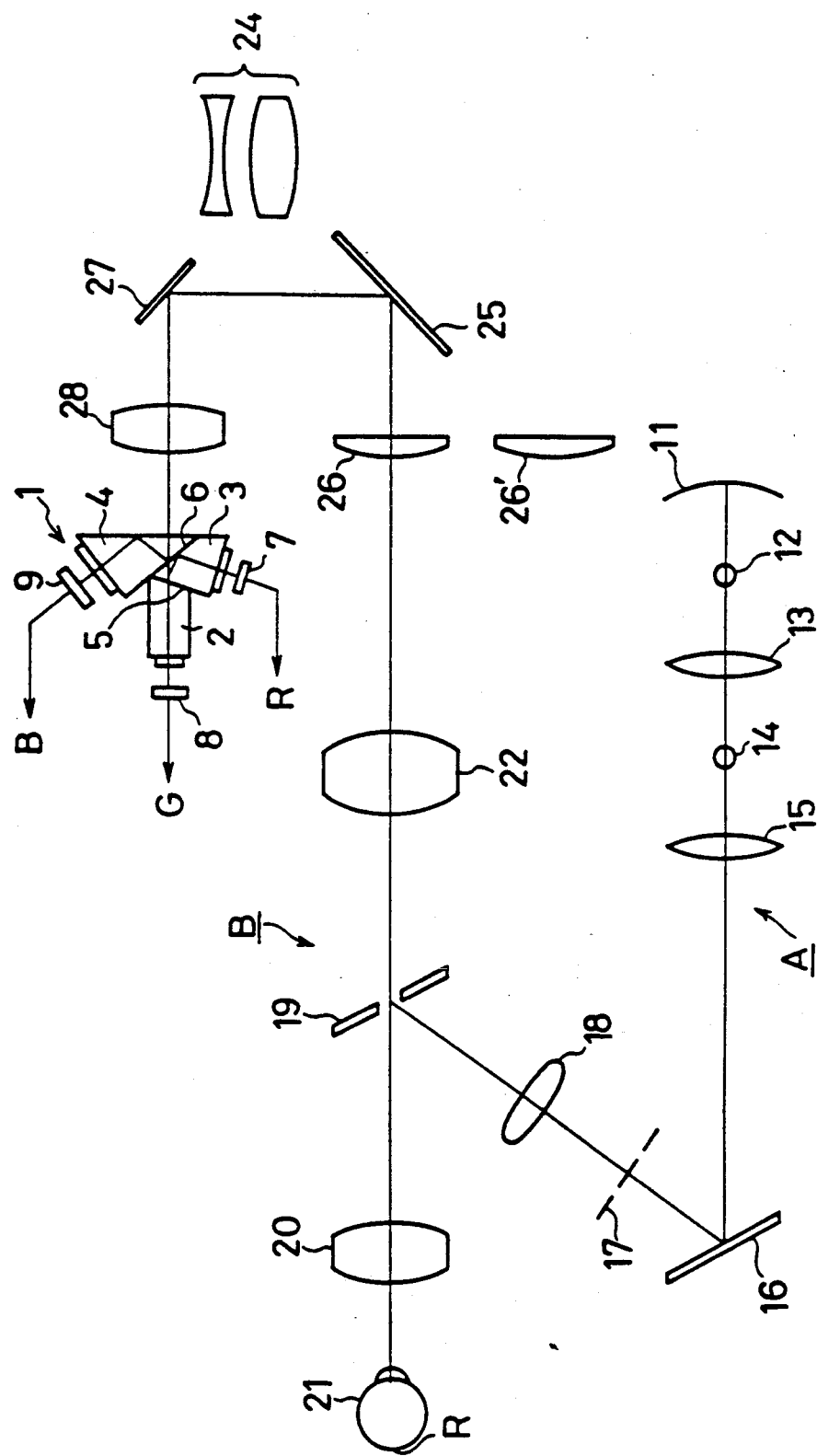
FIG. 7 is a schematic drawing showing a third embodiment of the color photography optical system of this invention.

FIG. 7 shows a third embodiment of the color photography optical system of this invention. In this embodiment, a variable lens 24 is provided between the field lens 26 and relay lens 28. Depending on the photographic conditions, the variable lens 24 may also be inserted or removed, and the field lens 26 exchanged for a field lens 26′ so as to make the light beam incident on the color separation optical system 1 telecentric.

As is clear from the above description, when the variable lens and the lens for observing the front portion of the eye are inserted so as to change the photographic conditions, the light beam incident on the color separation optical system 1 is no longer telecentric and color shading appears. By changing field lenses depending on whether the variable lens for observing the front portion of the tye are inserted in the optical path of the photographic optical system, however, color shading can be avoided.

Figure 8:
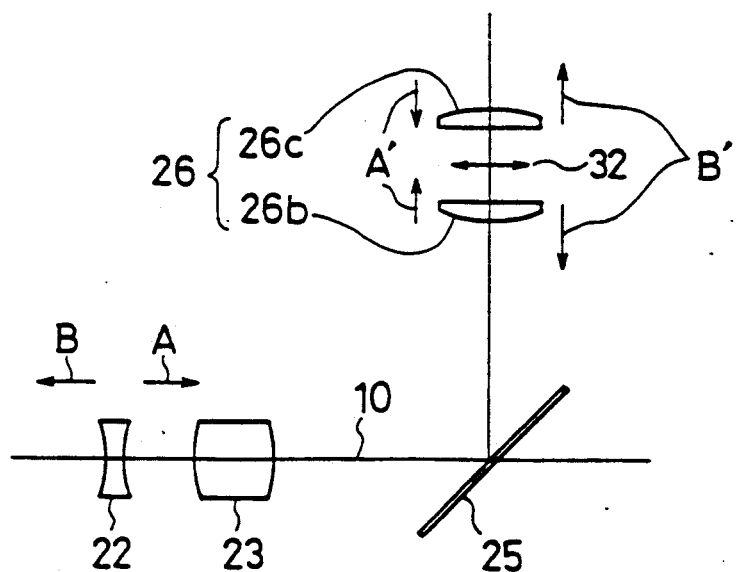
FIG. 8 is schematic drawing of a photographic optical system for the purpose of describing a fourth embodiment.

FIG. 8 shows a fourth embodiment of the color photography optical system of this invention.

In this embodiment, the fundus camera is provided with a focusing lens for applying a diopter correction to the subject's eye 21. When the focusing lens 22 is moved forward or backward along the photographic optic axis 10, the entrance pupil 35 (as shown in FIG. 2, for example) also moves along the photographic optic axis 10. The power of the field lens 26 must be varied and corrected continuously in synchronism with the movement of the focusing lens 22. This requires at least two lens assemblies 26b, 26c. In this fourth embodiment, these two lens assemblies 26b, 26c have effectively the same power, and are situated symmetrically on either side of the aerial image 32. When the focusing lens 22 is moved from the reference position in a direction A, the lenses 26b, 26c are driven together by an equivalent amount (in the direction A′) to correct the position of the entrance pupil 35. When the focusing lens 22 is moved in the direction B, the lenses 26b, 26c are driven symmetrically in opposite directions to one another (direction B) to correct the position of the entrance pupil. If the variable lens is of the zoom type, the lenses 26b, 26c must be moved continuously in synchronism with the zoom.

Figure 9:
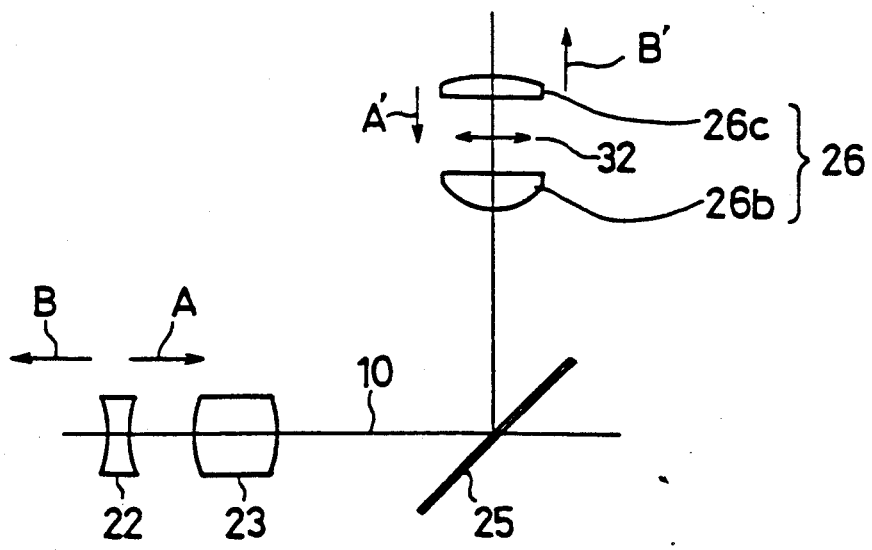
FIG. 9 is a schematic drawing showing one modification of the fourth embodiment.

If the power of the lens 26b is higher than the power of the lens 26c, only the lens 26c with the lower power need be moved continuously in synchronism with the movement of the focusing lens 22 to correct the position of the entrance pupil 35 (as shown in FIG. 2, for example) as shown in FIG. 9. Alternatively, the lens 26b of higher power may also be moved.

Figure 10:
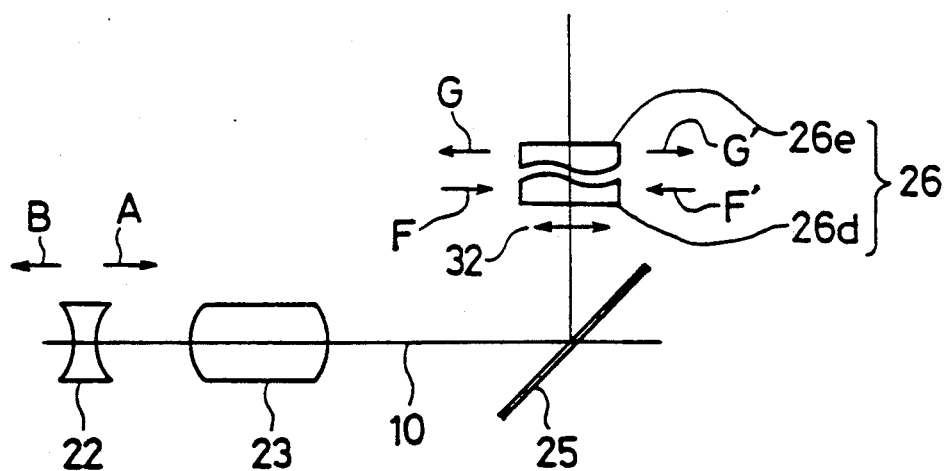
FIG. 10 is schematic drawing of a portion of a photographic optical system for the purpose of describing a fifth embodiment.

FIG. 10 shows a fifth embodiment of the color photography optical system of this invention. Variable focal length lenses, for example Alvaretz lenses 26d, 26e are used. In this case, when the focusing lens 22 is displaced in the direction A, the Alvaretz lens 26d is driven in direction F perpendicular to the optic axis, and the Alvaretz lens 26e is driven in a direction G perpendicular to the optic axis to correct the position of the entrance pupil 35. When the focusing lens 22 is moved in a direction B, the Alvaretz lens 26d is driven in a direction F′ perpendicular to the optic axis, and the Alvaretz lens 26e is driven in a direction G′ perpendicular to the optic axis.

If the displacement of the position of the entrance pupil due to the displacement of the focusing lens is small, the field lenses 26, 26′ can also be moved in the direction of the optic axis to make the image side telecentric.

As the color photography optical system of this invention has the aforesaid construction, color shading can easily be corrected merely by adjusting the arrangement of the optical system. Further, color shading can be corrected by a low cost arrangement.

In particular, using the color photography optical system of this invention, if the magnification or other photographic conditions are changed, solar shading can be rapidly corrected merely by modifying some of the optical components of the optical system.

What is claimed is:

1. A color photography optical system for bringing a light beam that has passed through an aperture diaphragm to an image in the vicinity of a field lens, guiding the light beam that has passed through the field lens via a relay lens to a three prism type color separation optical system having a photographic device, and forming an image on said photographic device, characterized in that:

the focal length of said field lens can be varied such that said light beam which has passed through the relay lens is effectively telecentric on the side of said color separation optical system.

2. A color photography optical system for bringing a light beam that has passed through an aperture diaphragm to an image in the vicinity of a field lens, guiding the light beam that has passed through the field lens via a relay lens to a three prism type color separation optical system having a photographic device, and forming an image on said photographic device, characterized in that:

at least one type of optical system for changing the photographic conditions is provided such that it can be inserted in or removed from the optical path between said aperture diaphragm and said color separation optical system, said field lens comprises several lenses of differing focal lengths, and said relay lens is replaced depending on whether said optical system for changing the photographic conditions is inserted in or removed from said optical path such that the light beam that has passed through said relay lens is effectively telecentric on the side of said color separation optical system.

3. A color photography optical system for bringing a light beam that has passed through an aperture diaphragm to an image in the vicinity of a field lens, guiding the light beam that has passed through the field lens via a relay to a three prism type color separation optical system having a photographic device, and forming an image on said photographic device, characterized in that:

at least one type of optical system for changing the photographic conditions is provided such that it can be inserted in or removed from optical path between said aperture diaphragm and said color separation optical system, said field lens comprises a main lens and an auxiliary lens depending on the photographic conditions, and said auxiliary lens is inserted in or removed from said optical path depending on whether said optical system for changing the photographic conditions is inserted in or removed from said optical path such that the light beam that has passed through said relay lens is effectively telecentric on the side of said color separation optical system.

4. A color photography optical system for bringing a light beam that has passed through an aperture diaphragm to an aerial image in the vicinity of a field lens, guiding the light beam that has passed through the field lens via a relay lens to a three prism type color separation optical system having a photographic device, and forming an image on said photographic device, characterized in that:

an optical system for changing the photographic conditions is provided in the optical path between said aperture diaphragm and said color separation optical system, the focal length of said field lens can be varied such that said light beam which has passed through the relay lens is effectively telecentric on the side of said color separation optical system, said field lens comprises at least two lens assemblies, and said two lens assemblies can be moved along said optic axis according to the change of said photographic conditions.

5. A color photographic optical system as defined in claim 4 characterized in that said two lens assemblies comprise lens having effectively equal powers, said two lens assemblies are arranged on either of said aerial image, and said two lens assemblies can be moved in opposite directions to one another by approximately the same amount.

6. A color photographic optical system as defined in claim 4 characterized in that said two lens assemblies comprises lens having different powers, and either one said two lens assemblies can be moved according to the change of said photographic conditions.

7. A color photography optical system for bringing a light beam that has passed through an aperture diaphragm to an image in the vicinity of a field lens, guiding the light beam that has passed through the field lens via a relay lens to a three prism type color separation optical system having a photographic device, and forming an image on said photographic device, characterized in that:

an optical system for changing the photographic conditions is provided in the optical path between said aperture diaphragm and said color separation optical system, the focal length of said field lens can be varied such that said light beam which has passed through the relay lens is effectively telecentric on the side of said color separation optical system, said field lens comprises at least two lens assemblies, and said two lens assemblies can be moved in a direction perpendicular to said optic axis according to the change of said photographic conditions.

8. A color photography optical system for bringing a light beam that has passed through a focusing lens to a image in the vicinity of a fields lens, guiding the light beam that has passed through the field lens via a relay lens to a three prism type color separation optical system having a photographic device, and forming an image on said photographic device, characterized in that:

the focal length of said field lens can be varied such that said light beam which has passed through the relay lens is effectively telecentric on the side of said color separation optical system, said field lens comprises at least two lens assemblies, and said two lens assemblies can be moved along said optical axis according to the displacement of said focusing lens such that the position of the emergence pupil of said relay lens is corrected.

9. A color photographic optical system as defined in claim 8 characterized in that said two lens assemblies comprises lens having effectively equal powers, and said two lens assemblies can be moved in opposite directions to one another by approximately the same amount.

10. A color photographic optical system as defined in claim 8 characterized in that said two lens assemblies comprise lens having different powers, and either one of said two lens assemblies can be moved according to the displacement of said focusing lens.

11. A color photography optical system for bringing a light beam that has passed through a focusing lens to an image in the vicinity of a field lens, guiding the light beam that has passed through the field lens via a relay lens to a three prism type color separation optical system having a photographic device, and forming an image on said photographic device, characterized in that:

the focal length of said field lens can be varied such that said light beam which has passed through the relay lens is effectively telecentric on the side of said color separation optical system, said field lens comprise at least two lens assemblies, and said two lens assemblies can be moved in a direction perpendicular to said optic axis according to the displacement of said focusing lens such that the position of the emergence pupil of said relay lens is corrected.

* * * * *

UNITED STATES PATENT AND TRADEMARK OFFICE
CERTIFICATE OF CORRECTION

PATENT NO. : 5,189,556
DATED : February 23, 1993
INVENTOR(S) : Hiroyuki Ohtsuka It is certified that error appears in the above-identified patent and that said Letters Patent is hereby corrected as shown below:

Claim 3, column 7, line 5, after "relay" insert --lens--.

Claim 3, column 7, line 11, after "from", insert --the--.

Claim 6, column 7, line 51, change "comprises" to --comprise--.

Claim 8, column 8, line 16, change "a" (second occurrence) to --an--.

Claim 8, column 8, line 28, change "optical" to --optic--.

Claim 9, column 8, line 34, change "comprises" to --comprise--.

UNITED STATES PATENT AND TRADEMARK OFFICE
CERTIFICATE OF CORRECTION

PATENT NO. : 5,189,556
DATED : February 23, 1993
INVENTOR(S) : Hiroyuki Ohtsuka

It is certified that error appears in the above-indentified patent and that said Letters Patent is hereby corrected as shown below:

Claim 11, column 8, line 54, change "comprises" to --comprise--.

Signed and Sealed this

Twenty-fifth Day of January, 1994

Attest:

BRUCE LEHMAN

Attesting Officer    Commissioner of Patents and Trademarks